(12) United States Patent
Rothstein

(10) Patent No.: US 7,360,097 B2
(45) Date of Patent: Apr. 15, 2008

(54) SYSTEM PROVIDING METHODOLOGY FOR SECURING INTERFACES OF EXECUTABLE FILES

(75) Inventor: Arthur Rothstein, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 166 days.

(21) Appl. No.: 10/711,491

(22) Filed: Sep. 21, 2004

(65) Prior Publication Data

US 2005/0071633 A1 Mar. 31, 2005

Related U.S. Application Data

(60) Provisional application No. 60/481,451, filed on Sep. 30, 2003.

(51) Int. Cl.
*G06F 12/14* (2006.01)
*G06F 13/00* (2006.01)

(52) U.S. Cl. ...................... 713/189; 719/331
(58) Field of Classification Search ........ 713/150–193; 709/229; 711/164
See application file for complete search history.

(56) References Cited

U.S. PATENT DOCUMENTS

| | | | | |
|---|---|---|---|---|
| 5,933,826 A | * | 8/1999 | Ferguson | 707/9 |
| 6,802,006 B1 | * | 10/2004 | Bodrov | 713/187 |
| 2004/0123308 A1 | * | 6/2004 | Idoni | 719/331 |

* cited by examiner

*Primary Examiner*—Nasser Moazzami
*Assistant Examiner*—Brandon S Hoffman
(74) *Attorney, Agent, or Firm*—John A. Smart; G. Mack Riddle

(57) ABSTRACT

A system providing methodology for securing interfaces of executable files is described. In one embodiment, for example, a method is described for securing a program comprised of a plurality of interoperable components, the method comprises steps of: extracting information about a function of a first component of the program that is callable by at least one other component of the program; securing the extracted information; in response to an attempt by a second component of the program to invoke the function of the first component, validating authenticity of the second component; and if the second component is validated, providing access to the function of the first component using the secured extracted information.

55 Claims, 10 Drawing Sheets

SYSTEM PROVIDING METHODOLOGY FOR SECURING INTERFACES OF EXECUTABLE FILES

CROSS REFERENCE TO RELATED APPLICATIONS

The present application is related to and claims the benefit of priority of the following commonly-owned, presently-pending provisional application(s): application Ser. No. 60/481,451, filed Sep. 30, 2003, entitled "System Providing Methodology for Securing Interfaces of Executable Files", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 168974 Bytes, created: Sep. 21, 2004 8:14:30 AM; Object ID: File No. 1; Object Contents: Source code.

BACKGROUND OF INVENTION

1. Field of the Invention

The present invention relates generally to systems and methods for maintaining security of computer systems and, more particularly, to a system providing methodology for securing a multiple module system.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape® Navigator) or other Internet applications. Browsers and other Internet applications include the ability to access a URL (Uniform Resource Locator) or "Web" site. In the last several years, the Internet has become pervasive and is used not only by corporations, but also by a large number of small business and individual users for a wide range of purposes.

As more and more computers are now connected to the Internet, either directly (e.g., over a dial-up or broadband connection with an Internet Service Provider or "ISP") or through a gateway between a LAN and the Internet, a whole new set of challenges face LAN administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs.

The software industry has, in response, introduced a number of products and technologies to address and minimize these threats, including "firewalls", proxy servers, and similar technologies—all designed to keep malicious users (e.g., hackers) from penetrating a computer system or corporate network. Firewalls are applications that intercept the data traffic at the gateway to a Wide Area Network ("WAN") and check the data packets (i.e., Internet Protocol packets or "IP packets") being exchanged for suspicious or unwanted activities.

Another security measure that has been utilized by many users is to install an end point security (or personal firewall) product on a computer system to control traffic into and out of the system. An end point security product can regulate all traffic into and out of a particular computer. For example, an end point security product may permit specific "trusted" applications to access the Internet while denying access to other applications on a user's computer. To a large extent, restricting access to "trusted" applications is an effective security method. However, despite the effectiveness of end point security products, issues remain in protecting the computer system against attack by malicious users and applications.

One particular problem is protecting the end point security product itself against attack by a malicious individual, organization, or application. Generally, an end point security product, like almost any other modern software program, comprises a number of different components (or modules) which are contained in multiple files. For example, a given software product may contain 20 or more component executable files (e.g., dynamic link libraries or .exe files). These components are typically installed and operate on one or more client (or server) computing devices which run operating systems such as the Microsoft Windows operating system.

Considerable information is available (e.g., published specifications) describing how to develop and implement a software program comprised of multiple component modules or files. For example, a wide range of information is available as to how to develop and implement programs for the Windows operating system environment (or "Win32"). Similarly, details about how program components are to communicate with each other are also readily available and well known. Moreover, tools are currently available from a number of vendors for analyzing a given program and determining how components of the program communicate with each other.

These tools and publicly available information make it easier for developers to develop and implement interoperable programs for a given environment (e.g., the Windows environment). Unfortunately, they also make it easier for a hacker to analyze (or reverse engineer) a given program consisting of multiple components (or modules) and intercept internal communications between the individual components of a given program. For example, a first module or component of an end point security program may have an interface to a particular function that is called by a second component (e.g., a user interface module or component) in order to shut down the program. If an attacker is able to identify this interface, the attacker may be able to send commands to shut down the security program using the identified interface. After shutting down the security program, the attacker may then have full access to and control of the computing system previously protected by the security program.

A solution is required that will obscure and "harden" internal program interfaces (e.g., of an end point security program) to make it more difficult for a malicious user or application to use these interfaces as a means to attack the program. Obscuring the interfaces makes it more difficult for a perpetrator to determine what to attack. Hardening the interface provides an additional measure of security in making it more difficult for the perpetrator (attacker) to actually use the interface to call a given function or component.

Existing solutions are available for obscuring program interfaces of a newly developed program in order to better secure the program against attack. However, these existing solutions are generally inappropriate for use with an existing program as they typically require extensive modifications to be made to the underlying program source code. This is undesirable for several reasons. Making source code modifications to a program may cause errors to be introduced into the program. Also, it may require considerable effort to modify the program in this fashion. In addition, even if one is willing to make these modifications to the underlying program, this approach only obscures interfaces and generally does not serve to harden program interfaces against attack.

What is required is a solution that will both obscure and harden internal program interfaces in order to make it more difficult for a malicious user or application to attack a program using these internal interfaces. Implementation of the solution should not require extensive rewrites to the source code of the program. Ideally, the solution should also provide protection from an attacker attempting to intercept calls made by a program to the underlying operating system on which it is running as a means for attacking the program. The present invention provides a solution for these and other needs.

SUMMARY OF INVENTION

A system providing methodology for securing interfaces of executable files is described. In one embodiment, for example, a method of the present invention is described for securing a program comprised of a plurality of interoperable components, the method comprises steps of: extracting information about a function of a first component of the program that is callable by at least one other component of the program; securing the extracted information; in response to an attempt by a second component of the program to invoke the function of the first component, validating authenticity of the second component; and if the second component is validated, providing access to the function of the first component using the secured extracted information.

In another embodiment, for example, a method of the present invention is described for securing a program comprised of a plurality of modules, at least one of the modules having export information for allowing other modules to invoke its program code, the method comprises steps of: generating signatures for at least some of the program's modules; as the program is loaded, validating the signatures so as to verify authenticity of respective modules of the program; for each module having program code that may be invoked by another module, removing that module's export information; securely storing any removed export information; for each module having its export information removed, blocking any attempt from another module to invoke its program code if the other module cannot be authenticated; and if the other module is authenticated, allowing the attempt to proceed using the securely stored export information.

In yet another embodiment, for example, a system of the present invention for securing a program comprised of a plurality of interoperable components is described that comprises: a module for extracting information about a function of a first component of the program that is callable by at least one other component of the program; a module for securing the extracted information; a validation module for validating authenticity of a second component attempting to invoke the function of the first component; and a security module for blocking the attempt to invoke the function of the first component if the second component cannot be authenticated.

In another embodiment, for example, a method of the present invention is described for securing an exported function of a program, the method comprises steps of: extracting export information about the exported function of the program; securing the extracted export information; intercepting an attempt to access the exported function by an importer; authenticating the importer for determining whether to permit access to the exported function; and if the importer is authenticated, providing access to the exported function based on the secured extracted export information.

DETAILED DESCRIPTION

Glossary

Figure 1:
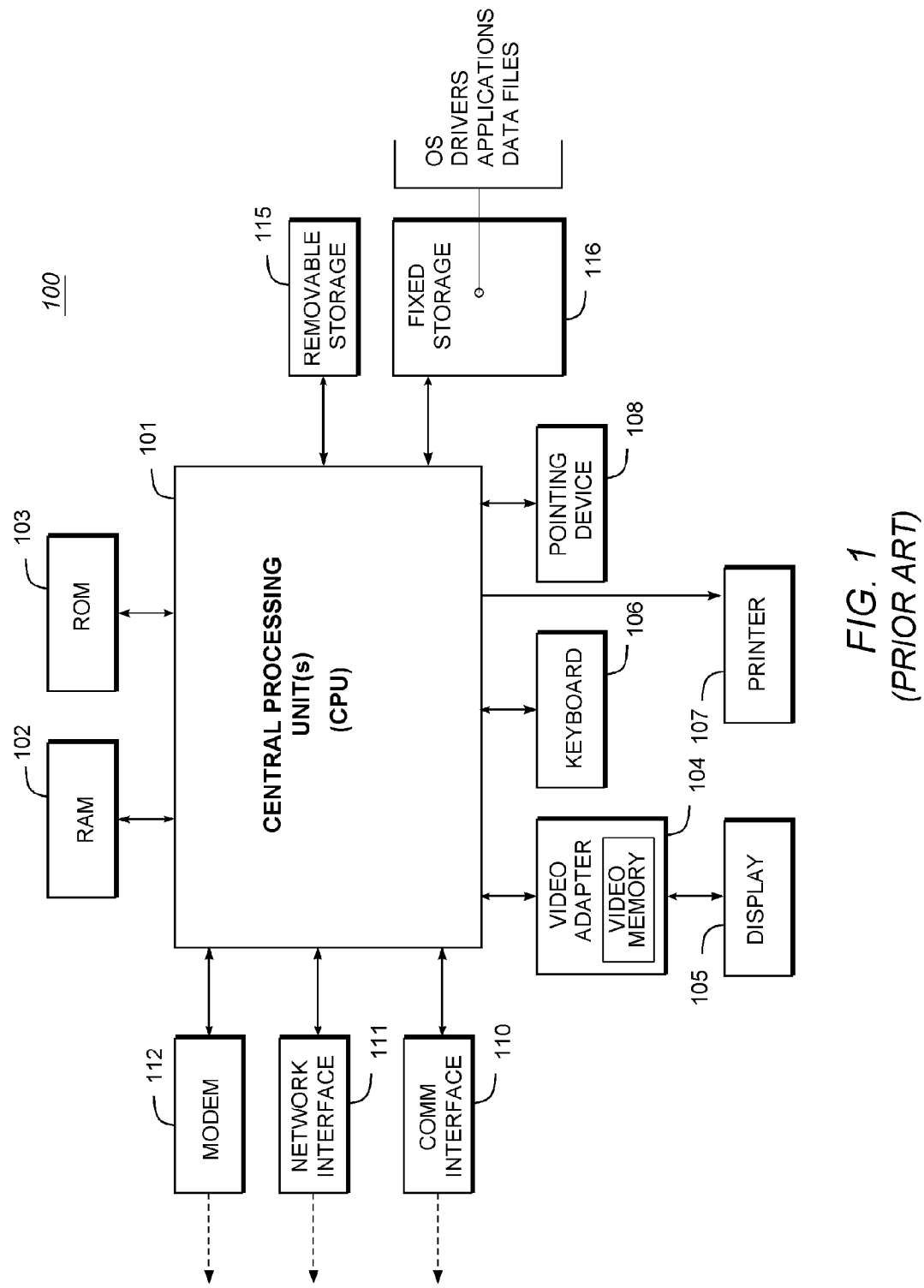
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Authenticode: Authenticode refers to technology available from Microsoft enabling users to identify who published a particular software program and verify the authenticity of the program (i.e., that the program has not been tampered with or altered since publication). Authenticode technology provides for generating a digital signature string that is bundled with the software. The digital signature can be used to verify the publisher of the software and determine whether the program has been altered. Generally, digital signatures are created using a public-key signature algorithm such as the RSA public-key cipher. A public-key algorithm actually uses two different keys: the public key and the private key (called a key pair). The private key is known only to its owner, while the public key can be available to anyone. Public-key algorithms are designed so that if one key is used for encryption, the other is necessary for decryption. Furthermore, the decryption key cannot be reasonably calculated from the encryption key. In digital signatures, the private key generates the signature, and the corresponding public key validates it. In practice, public-key algorithms are often inefficient for signing software programs or documents. To increase efficiency, digital signature protocols use a cryptographic digest, which is a one-way hash of the program. The hash is signed instead of the program itself. Both the hashing and digital signature algorithms are agreed upon beforehand. The process can be summarized as follows: a one-way hash of the program is produced; the hash is encrypted with the private key, thereby signing the program; the program and the signed hash are distributed or transmitted; the recipient produces a one-way hash of the program; using the digital signature algorithm, the recipient decrypts the signed hash with the sender's public key; and the recipient determines if the signed hash matches the recipient's hash (i.e., compares the signed hash to a known value). If the signed hash matches the recipient's hash, the signature is valid and the program is intact. Further description of Authenticode signatures is available from Microsoft Corporation, the disclosure of which is hereby incorporated by reference. Description of Authenticode signatures is available from Microsoft via the Internet (e.g., currently at www.microsoft.com/library).

Compiler: A compiler is a program which translates source code into object code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A Java compiler translates source code written in the Java programming language into bytecode for the Java virtual machine. For general background on the construction and operation of compilers, see e.g., Fischer et al., "Crafting a Compiler with C", Benjamin/Cummings Publishing Company, Inc., 1991, the disclosure of which is hereby incorporated by reference for purposes of illustrating the state of the art.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a local area network (LAN) or a larger wide area network (WAN) such as the Internet in order to provide security to the machine. For further information regarding an end point security solution for controlling the interaction of a machine with other connected machines and devices, see e.g., commonly-owned U.S. Pat. No. 5,987,611, entitled "System and methodology for managing Internet access on a per application basis for client computers connected to the Internet", the disclosure of which is hereby incorporated by reference.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

Linker: A program that combines object code modules to form an executable program, including replacing symbolic addresses with real addresses.

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MD5 is available in "RFC 1321: The MD5 Message-Digest Algorithm", (April 1992), the disclosure of which is hereby incorporated by reference. A copy of RFC 1321 is available via the Internet (e.g., currently at www.ietf.org/rfc/rfc1321.txt).

Network: A network is a group of two or more systems linked together. There are many types of computer networks, including local area networks (LANs), virtual private networks (VPNs), metropolitan area networks (MANs), campus area networks (CANs), and wide area networks (WANs), including the Internet. As used herein, the term "network" refers broadly to any group of two or more computer systems or devices that are linked together from time to time (or permanently).

Portable Executable: Win32-based executable (image) files are structured according to Microsoft's Portable Executable (PE) format. The name "Portable Executable" refers to the fact that the format is not architecture-specific. For further description of the Portable Executable format, see e.g., "Microsoft Portable Executable and Common Object File Format Specification", revision 6.0, February 1999, the disclosure of which is hereby incorporated by reference. A copy of this document is available via the Internet (e.g., currently at www.microsoft.com/whdc/system/platform/firmware/PECOFF.mspx).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)", the disclosure of which is hereby incorporated by reference. For additional information, see also e.g., "RFC 2704: The KeyNote Trust Management System Version 2", available from the IETF, the disclosure of which is hereby incorporated by reference. A copy of RFC 2704 is available from the IETF via the Internet (e.g., currently at www.ietf.org/rfc/rfc2704.txt). In this document "security policy" or "policy" refers to a set of security policies and rules employed by an individual or by a corporation, government entity, or any other organization operating a network or other computing resources.

Winsock: Winsock refers to the Microsoft Windows Sockets 2 interface, which enables programmers to create network-capable applications to transmit application data across a network independent of the network protocol being used. Winsock defines a standard service provider interface (SPI) between the application programming interface (API), with its exported functions and the protocol stacks. It uses the sockets paradigm that was first popularized by Berkeley Software Distribution (BSD) UNIX. For further information regarding Winsock, see e.g., "Windows Sockets API Reference", available from Microsoft Corporation, the disclosure of which is hereby incorporated by reference. A copy of this documentation is available via the Internet (e.g., currently at msdn.microsoft.com/library).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bidirectional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
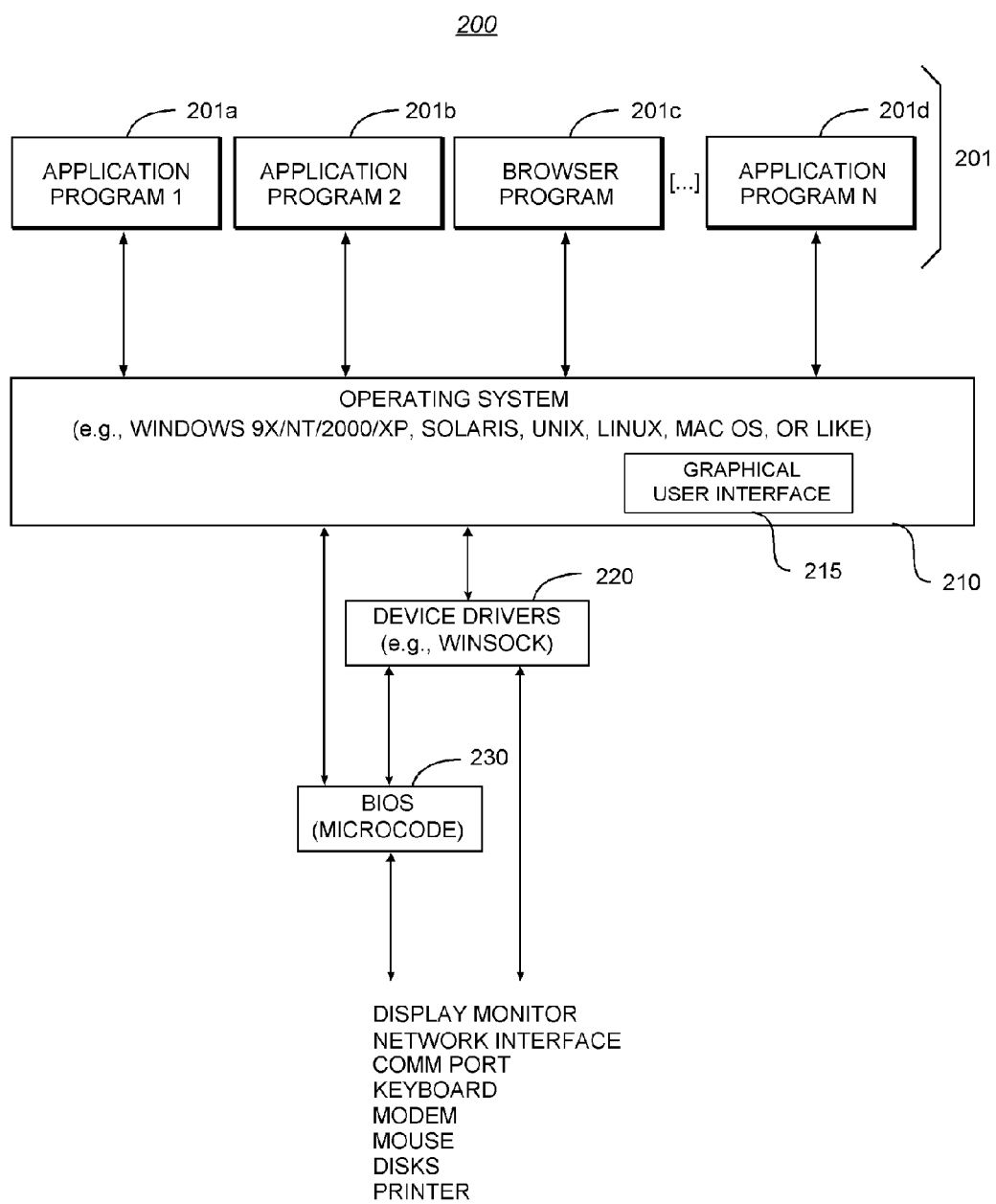
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Methodology for Securing Interfaces of Executable Files

Background

The mechanism for communication between different components of a program commonly referred to as "exports" and "imports" and are supported by development tools from various vendors, including Microsoft Corporation of Redmond, Wash. and Borland Software Corporation of Scotts Valley, Calif. Generally, "exports" and "imports" are embodied partially in program code and partially in tables (e.g., export tables) that are part of the program files and have a well-documented structure. In a normal application environment, an executable file (typically a dynamic link library (referred to herein as a DLL or .dll) or an .exe file) frequently "exports" certain functions to make them available to other program components. These functions appear in the file's export directory, and are easily displayed by common developer tools as previously described. Other executable files (or modules) can call or "import" these functions. The following discussion will illustrate the operation of the present invention using a simple example of an executable file or module (e.g., an .exe file) which imports a function from an export module (e.g., a .dll file). Those skilled in the art will appreciate, however, that this is only an example and that a given executable module may both import and export functions. In fact, a typical real-world environment is usually more complex with a plurality of modules importing and exporting functions.

Figure 3A:
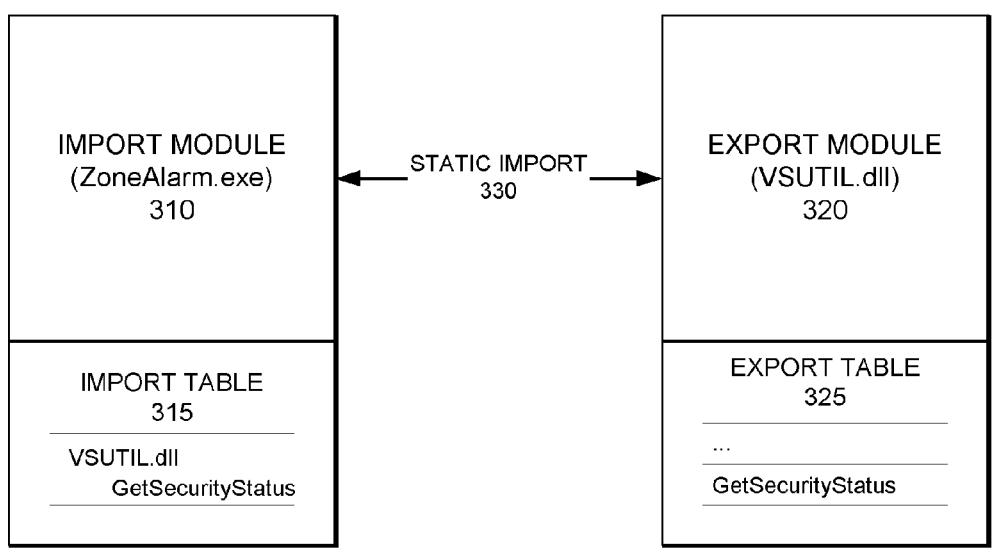
FIG. 3A is a block diagram of an environment in which an executable module (importer) has a conventional load-time (or "static") import.

FIG. 3A is a block diagram of an environment 300 in which an executable module (importer) has a conventional load-time (or "static") import. As shown, the environment 300 includes an import module (executable file) 310 (e.g., ZoneAlarm.exe) having an import table 315 and an export module 320 (e.g., VSUTIL.dll) having an export table 325. As also shown, the import module 310 (ZoneAlarm.exe) has a load time (static) import 330 from the export module 320 (VSUTIL.dll).

The import table 315 is built by the linker and contains a list of the (external) functions that are callable by the import module 310. In this case, the import module 310 includes a call to a function called "GetSecurityStatus" of a VSUTIL.dll export module 320, so the linker includes a listing for this function in the import table 315. When the operating system loader (not shown at FIG. 3) loads the import module 310, the loader looks at the import table 315 and proceeds to load the export module (VSUTIL.dll) 320. The loader then identifies the "GetSecurityStatus" function in the export table 325 of the export module 320. The loader may also recursively load any modules having exported functions statically imported into the export module 320 and so forth. For a conventional load-time import, the load of the importer causes the operating system (OS) to ensure that the exporter is loaded. If the exporter is not already loaded, the OS temporarily suspends its load of the importer in order to load and initialize the exporter. If the exporter itself also contains load-time imports, this process continues recursively. After any statically imported modules are loaded, the loader goes back to the import table 315 and determines that "GetSecurityStatus" is an imported function. The loader then goes out to the export module 320 (VSUTIL.dll), finds the address of "GetSecurityStatus" in the export table 325 and inserts this address into a slot in the import table 315.

At runtime, when the import module (executable file) 310 calls the "GetSecurityStatus" function of VSUTIL.dll 320, the call is made using the address stored in the import table 315. In this manner calls made by the import module 310 to the "GetSecurityStatus" function can be resolved through traditional load time importing (static importing), a widely known and well-used technique. Unfortunately, however, it also creates some well-known vulnerabilities that a malicious user can use to attack a target program.

Figure 3B:
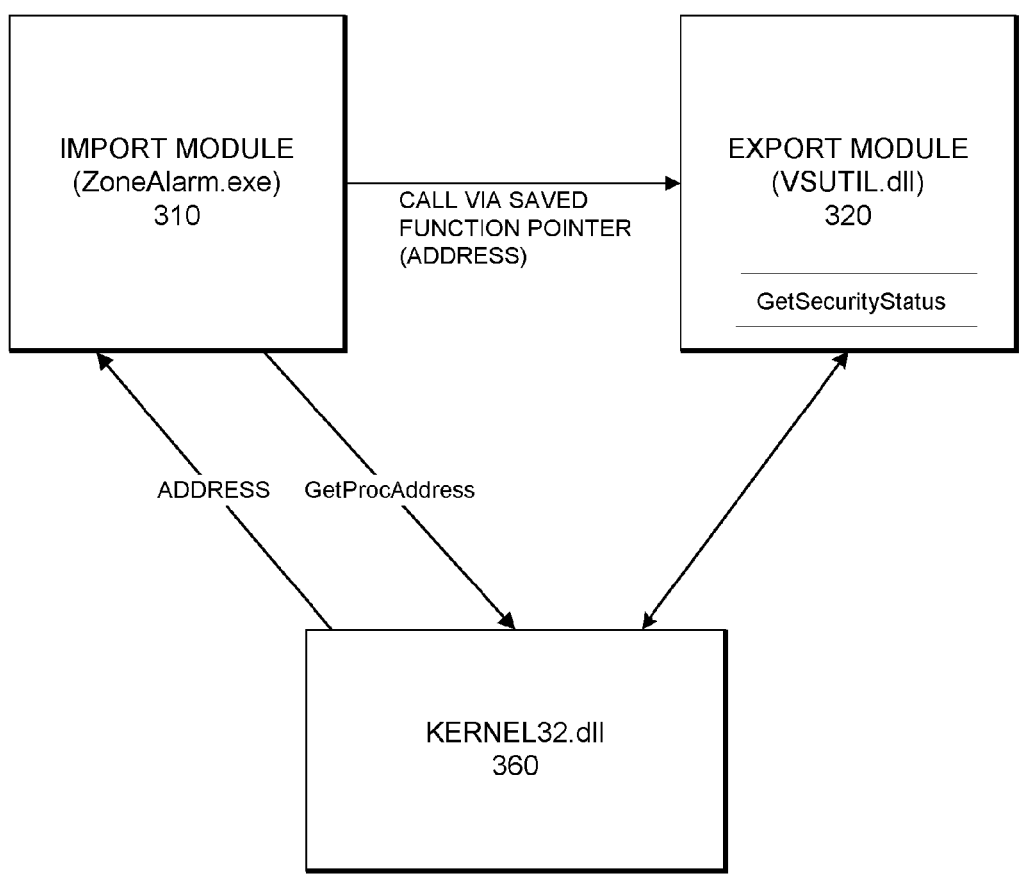
FIG. 3B is a block diagram of an environment in which an executable module has a conventional runtime (or "dynamic") import.

FIG. 3B is a block diagram of an environment 350 in which an executable module has a conventional runtime (or "dynamic") import. As shown, environment 350 includes an import module (executable file) 310 (e.g., ZoneAlarm.exe), an export module 320 (e.g., VSUTIL.dll), and a KERNEL32.dll 360. As with the prior example, assume that the export module 320 includes an exported (or export) function named "GetSecurityStatus" that is called by the importer (executable file) 310. As shown at FIG. 3B, in the case of runtime (dynamic) imports the import module 310 issues a call to a "GetProcAddress" Win32 API function of the KERNEL32.dll 360 to obtain the address of the export function. The import module 310 usually stores this address in a variable that is used when calling the export function. As shown, the import module 310 (e.g., ZoneAlarm.exe) issues a call to the export module 320 using the saved variable (function pointer).

Generally, for a malicious user (or application) to attack a target program through an interface to a function or module of the target program, the perpetrator needs to identify a function to call to initiate an attack and determine where the function is located. In other words the attacker needs to identify the function or module to be attacked and the address where it is located. Currently, export and import tables frequently include function names in clear text format (i.e., the function names are not encrypted or obscured). In many cases these function names are also very descriptive of what action the function performs (e.g., a "shutSystemDown" function to shut down the system). Also, communication methods are well known and can be intercepted by a perpetrator to determine the location of a function of interest. These factors, together with the ready availability of specifications and other information describing the environment in which a program is installed, can make a program vulnerable to attack by a malicious program or user.

General Approach of the Present Invention

The present invention comprises a system providing methods for obscuring and hardening the interfaces among executable files (e.g., executable files in Portable Executable or "PE" format). Executable files are also referred to in this document as "components" or "modules". The following discussion uses examples of executable files running on the Windows operating environment for illustrative purposes. However, the present invention is not limited to any particular environment or device configuration. Win32-based executable (image) files are structured according to Microsoft's Portable Executable (PE) format. PE images are produced by a compatible Win32 linker, such as the one provided by Microsoft Visual Studio. For a given executable file, at install time the file's PE image is bound to the operating system configuration of the target machine. For further description of the Portable Executable format, see e.g., "Microsoft Portable Executable and Common Object File Format Specification", revision 6.0, February 1999, the disclosure of which is hereby incorporated by reference.

The approach of the present invention is first to post-process export tables that have been built in a conventional fashion. This post-processing of a given table includes reformatting the table, extracting much of the data from the table, shrinking what remains of the table (i.e., reducing its size in the file), and then re-using the available space created by shrinking the table to house a table in a proprietary (i.e., protected or hardened) format. The proprietary table(s) that is created does not include clear text function names. Instead, the table is hardened to make it more difficult to attack. It should be noted that the technique of the currently preferred embodiment for shrinking the original table (i.e., export table) and using the recaptured space for the proprietary (new) table is an optimization that enables the file to be updated in place. However, using the recaptured space in this fashion is not necessary for the implementation of the present invention.

As part of the post-processing of the export tables, any export (i.e., exported function) in an original export table that is to be secured is entirely removed from the original table. This makes it more difficult for an attacker to locate and call these functions as a means of attacking the program. Some existing techniques obscure exported functions. For example, the linker "NONAME" keyword may prevent runtime imports by function name. The methodology of the present invention goes further in an effort to provide greater security. The approach of the present invention is to entirely remove the secured export from a file's export directory (i.e., export table). This is an improvement over prior solutions which typically obscure function names, but do not remove them from the export table.

The removal of clear text function names from the original export table makes it more difficult for an attacker to determine what function it can use to attack a program. Removing information from the export table also makes it more difficult for an attacker to find the address of the function in order to initiate an attack. By removing function names from the export table, as well as hiding the addresses of these functions, the methodology of the present invention makes it much more difficult to identify an avenue for attacking the program. The methodology of the present invention also makes it more difficult for an attacker to use various well-documented system calls to determine the address of a function that is targeted for attack as described later in this document.

It remains the case that in order for a first component or module of a program to communicate with a second module, the first module must have (or be able to obtain) the address of the second module. Despite obscuring function names and removing them from an export table, an attacker may still attempt to intercept communications between these modules (e.g., a communication requesting the address of the second module) in an attempt to attack the program. However, the methodology of the present invention, as hereinafter described, also serves to make it much more difficult to successfully make this type of attack.

Hardening is achieved by forward and backward validation of the code signature using a "self-validation" feature. After loading an executable (PE) file, but before calling any of its secured exports, both the code signatures of the importer and the exporter are validated (if not previously validated). It should be noted that each module is validated only once as it loads. The exporter may, for example, have been previously validated. If this is the case, the exporter is not validated again when the importer is loaded. The importer's calls fail if this validation is skipped. The methodology of the present invention for validation (sometimes referred to herein as self-validation) of the importer and the exporter is described in more detail below.

Self-validation of Importer and Exporter

Conventionally, when an exporter is built the exporter creates a file (e.g., a library or LIB file) as part of the build process that the importer uses when the importer is built in order to communicate with the exporter. Exports used in load time imports usually appear in a LIB file generated during the link of the exporting module. The linker then creates an import directory (table) in the importing module. When the importer is loaded, its import directory table entries are resolved by the loader (e.g., a Win32 loader in a Windows environment) which loads the exporting modules as necessary. The importer's code, generated by the compiler and linker, calls indirectly through these table entries to the exported functions.

The methodology of the present invention provides for modifying the LIB file created for the exporter (and used by the importer) in order to provide increased security. Consider first the case of load time (static) imports. Secured exports still appear in the LIB file created for the exporter, but not as exports. Instead the file created for the exporter (e.g., the LIB file) is modified by changing import definitions to "stub functions" (or simply "stubs"). The stubs point to a module referred to as a "first load DLL", which works with a companion function to perform the validation and resolve the call. It should be noted that the validation of the importer and the exporter occur when each module is loaded. Although the importer (e.g., ZoneAlarm.exe) and the exporter (e.g., VSUTIL.dll) may load at roughly the same time, their respective validations are independent.

After the importer is built, the importer can issue the same call (which may vary based on whether a load time or a runtime import is involved) to invoke the exporter. In other words, no source code modifications to the import module are required. However, because of the modifications made to the LIB file created for the exporter, the importer will consider this to be a call inside the importer itself. If an attacker attempts to build a module like the importer to call the exporter, the call is handled by the local stub function which causes the importer to crash (i.e., cease operating).

Generally, when an executable file (importer) having load time imports from dynamic link libraries (DLLs) is loaded, very little initialization is done in the executable (importer) until all of these DLLs (including those imported directly or indirectly) are loaded and initialized. The methodology of the present invention provides that when the importer is loaded, a particular file (DLL) with which the importer is built is loaded and initialized before other files (as described in more detail below). This particular file (module) which is referred to herein as the "first load DLL" sets up a security (or authentication) environment. Each self-validating module (e.g., the importer) also specifies its own exception-handling environment in code linked from SecureLinks.lib. This exception-handling environment has a short life span, guarding only the initialization of that module. As part of the initialization, a static initializer causes a designated exception to be raised when the importer is loaded. The exception-handling environment is set up so that when an exception is raised the exception does not necessarily crash the importer, but instead the exception is routed to the exception filter in the first load DLL. The exception filer handles the exception by determining where the exception was generated (i.e., identifying which file or module caused the exception to be generated) and performing an Authenticode signature validation on the identified file (e.g., an executable file) to verify that the identified file is known and trusted, and that it has not been modified since the time that it was built and signed. The first load DLL may also (optionally) validate other properties of the calling module. Although an Authenticode signature mechanism is used in the currently preferred embodiment of the present invention for validating files or modules of a program, those skilled in the art will appreciate that other digital signature techniques such as MD5 may also be used, as desired.

Besides serving as a gatekeeper, the first load DLL also serves as a traffic cop. An importer's calls to functions that have been secured (sometimes referred to herein as "secured exports") are routed through the first load DLL and resolved there. In the case of load time imports, for example, after the file (i.e., executable file) is identified as a trusted program or application, the in-memory copy of the executable file is modified. The modification made to the executable file (importer) provides that when the importer makes the call to invoke the exported function, the call is handled by the local "stub" function, which routes the call to the first load DLL instead of looking up the export function in the import directory and invoking it in a conventional fashion. The first load DLL, in turn, analyzes the call and locates the export function (exporter) being called.

The above process increases security by obscuring interfaces and validating both the importer and the exporter. However, a remaining problem to be addressed is that making the call to the exporter through the stub function and the first load DLL is an inefficient path that may impact performance of the application. For this reason, after the initial call to the export function is completed, the first load DLL goes back to the static link in the import module of the application and "back-patches" (or modifies) the code (if possible) so that subsequent calls from that particular calling instruction will go directly to the export module (i.e., without routing through the stub function and first load DLL in each instance). In many cases, the resulting path is, in fact, more efficient than a conventional static import.

For runtime (dynamic) imports a similar, but slightly less complex, approach is utilized. In the case of runtime (dynamic) imports, the importer specifically asks the operating system (OS) to load the exporter (e.g., through a LoadLibrary function or one of its variants). The operating system loads the exporter if it is not already loaded. Otherwise, it simply finds the module in memory. In either case, a value is returned to the caller that them is used as input for calling the export function (e.g., used as input to the GetProcAddress Win32 API call). If the exporter is a self-validating module it is authenticated when it is loaded as described above.

In the case of a load time import, at runtime an application (importer) simply calls the target function and the operating system makes the connection to the target (i.e., export function). With a runtime import, in contrast, the application specifically asks for the address of the target function (e.g., via a call to a "GetProcAddress" Win32 API function as described above). The application then uses that address to call the target function. As in the case of static imports, the application calling an export function that is dynamically imported will call "GetProcAddress" (i.e., the same call that it would otherwise make as the application source code does not need to be modified). However, the methodology of the present invention provides for modifications to be made at link time to provide for this call to resolve to "SecureGetProcAddress" at runtime. The call to "SecureGetProcAddress" is then routed to the first load DLL. It should be noted that in this case the importer and the exporter have already been loaded. Therefore, assuming that the importer and exporter are self-validating modules they have already been authenticated. Because of the above modifications, an attacker cannot find the address of the export function using the standard "GetProcAddress" function. This makes it much more difficult for an attacker to use (i.e., "hook") this well-known Win32 API function as an avenue for attacking a program (e.g., an end point security program). The system and methodology of the present invention also protects the system against attack by a hacker that uses a debugger, or other tools, to watch all calls to the standard "GetProcAddress" function, thereby obtaining a partial profile of his/her prey's behavior. Since "SecureGetProcAddress" does not use "GetProcAddress" except in very rare cases, a hacker watching calls to "GetProcAddress" will obtain considerably less information. This provides additional security, making it more difficult for a hacker to obtain information in this fashion in order to launch an attack on the system.

Integration with Other Programs

The methodology of the present invention also simplifies implementation, as no changes to the underlying application are required to secure a module's exports. All modules of interest can be built with self-validation. A small change to the linker commands causes the linker to include importer and exporter support. This generally results in a slight increase to module size (in memory), but does not otherwise change the module's behavior.

System Components

Figure 4:
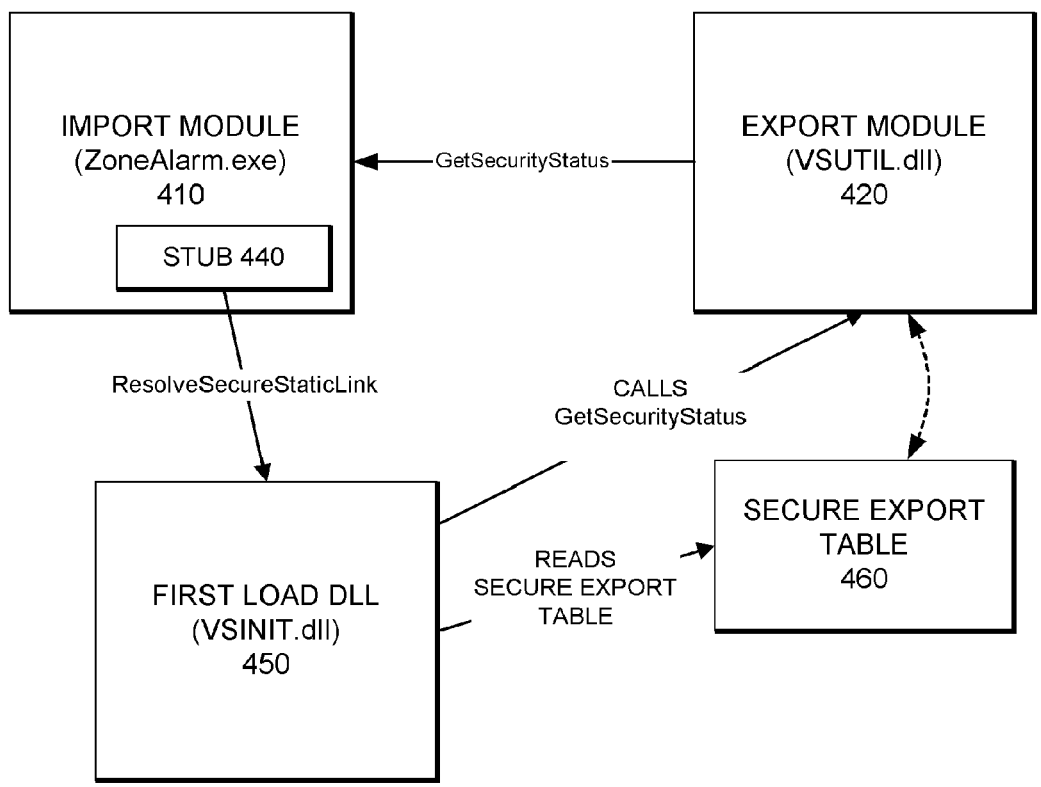
FIG. 4 is a block diagram of an environment in which the system and methodology of the present invention may be employed for securing a program including an export module that is statically imported by an importer (executable file).

FIG. 4 is a block diagram of an environment 400 in which the system and methodology of the present invention may be employed for securing a program including an export module that is statically imported by an importer (executable file). The following discussion uses an example of employing the system of the present invention for securing calls made by an executable file (importer) to a particular exported function in a module that is statically imported by the importer. As shown, environment 400 includes an import module (executable file) 410 (e.g., ZoneAlarm.exe), an export module 420 (e.g., VSUTIL.dll), a stub 440, a first load DLL 450 (e.g., VSINIT.dll), and a secure export table 460 associated with the export module 420. The operation of these components at runtime in resolving a call made by the import module 410 (e.g., ZoneAlarm.exe) to an exported function (e.g., a "GetSecurityStatus" function) of the export module 420 will now be described.

The import module 410 may, for example, include an instruction that calls the "GetSecurityStatus" function of the export module 420 (VSUTIL.dll). Because of the post-processing performed at the time these modules were built (described later in this document), the machine instructions in the import module 410 are different than those of the previously described conventional static import. In this case, the call to "GetSecurityStatus" resolves to a small stub 440 that was inserted into the import module 410 during program linking. The stub 440, in turn, calls a function (e.g., a "ResolveSecureStaticLink" function) of the first load DLL 450. In making this call, the stub 440 adds a few parameters that are needed by the first load DLL 450 to resolve the call.

The first load DLL 450 (VSINIT.dll) analyzes the parameters of the call received from the stub 440 and identifies the target module that is being called (e.g., export module 420). The first load DLL 450 ensures that the export module 420 is loaded and has a valid Authenticode signature. The first load DLL 450 also uses the information received to analyze the target export module 420. The first load DLL 450 does not actually call the "GetSecurityStatus" function of the export module 420. Instead, the first load DLL 450 reads the secure export table 460 associated with the export module 420 (VSUTIL.dll). The secure export table 460 is created at build time and includes information derived from the conventional export table associated with the export module 420. More particularly, the first load DLL 450 locates the address of the "GetSecurityStatus" function in the secure export table 460. The call originally made by the import module 410 to this "GetSecurityStatus" function is then executed against this "GetSecurityStatus" function of export module 420 as shown at FIG. 4. As also shown, return values (if any) are then returned by the export module 420 directly to the import module 410.

If the call from the importer (executable file 410) has code that is at least 5 bytes long and meets certain additional requirements, the first load DLL module 450 can also take itself out of the path for subsequent calls by "back-patching" the call made by the import module 410. In an Intel x86 environment, for example, call instructions can be in many forms, with lengths of 2-7 bytes. Generally, the compiler decides which call instructions to use based on several factors, including user-specified optimization settings. The compiler may, for example, direct the call to a relay point that executes additional instructions before jumping to its eventual target. Back-patching may bypass these additional instructions. The call cannot be back-patched if there is a relay target and it contains anything other than forms of JMP. (Generally, a JMP instruction transfers program control to the instruction at a specified memory location). Recall that the initial call made by the importer to "GetSecurityStatus" was resolved to the stub function 440. This call is back-patched (if possible) by changing it to a direct call to the export module 420 (VSUTIL.dll). Unlike the conventional import/export situation involving an indirect call to the exporter, in this case after the initial call is made and back-patched, the importer can make a direct call to the exporter. This is slightly more efficient (in terms of CPU resources) than an indirect call that is conventionally made.

Detailed Operation

Load-time Operations for Secure Static Imports

The following will describe the typical operations that occur at load time in a program constructed in accordance with the teachings of the present invention in the case of load time (static) imports. As with the prior discussion, the following illustrates the operation of the present invention using a simple example of an executable file which imports a function from an export module. As previously noted, this is only one example of a situation in which the present invention may be used and the present invention may also be used in a variety of other environments and circumstances. In particular, a given module (e.g., an .exe executable file) may be both an importer and an exporter. A DLL can also be an importer as well as an exporter (except for the first load DLL which is an exporter but cannot be an importer). As another example, a module that exports securely can also import securely in accordance with the methodology of the present invention. Multiple modules may import and export functions in a given environment. Also, load time imports and runtime imports are not mutually exclusive and a given module may have both load time and runtime imports from other modules. Accordingly, it should be understood that the examples used in this document are for purposes of illustrating the operation of the present invention and not for purposes of limitation.

In the currently preferred embodiment, the importer (e.g., ZoneAlarm.exe in the above example) continues to have one or more load time (static) imports that are resolved in a conventional fashion. The first load DLL module (VSINIT. dll) may also have one or more conventional exports. For example, the first load DLL, in its presently preferred embodiment, includes an export function named "DefaultExceptionHandlerEx" which is used to create an exception-handling environment for routing calls made by the importer (ZoneAlarm.exe) to the first load DLL as hereinafter described. In order to provide security against attack, this export function is identified by ordinal only so that when an attacker runs standard tools to analyze the first load DLL, the export function cannot be identified by name.

As previously described, the methodology of the present invention does not require source code modifications (e.g., to the .cpp or .h files of a C++ program) for a program (e.g., an end point security program) to be protected. However, certain of the build commands are modified in order to implement the methodology of the present invention. One of these changes is adding an "INCLUDE" command in building the importer (e.g., ZoneAlarm.exe). More particularly, an "INCLUDE:_TellLinkerToIncludeSelfValidation" command tells the linker to include a self-validation function. This ensures that the linker includes (i.e., links in) all of the necessary stubs.

One of the stubs that is linked in imports the above-described "DefaultExceptionHandlerEx" function of the first load DLL module using a conventional load time import. This is structured in a manner that ensures that the first load DLL module is loaded and that its initialization runs before the initialization of the importer (ZoneAlarm. exe). In addition, steps are taken to make sure that the first load DLL (VSINIT.dll) is initialized before initialization of any other application modules (i.e., other than certain operating system components such as KERNEL32.dll) that may be statically imported by the importer (ZoneAlarm.exe). In addition, any such application module (e.g., another dynamic link library) that is statically imported by ZoneAlarm.exe also statically imports VSINIT.dll (i.e., the first load DLL) so that such application module will also defer initialization until after the first load DLL (VSINIT. dll).

When a program is loaded and commences initialization, it executes its initialization code in a predetermined order. This order may be partially specified using current compiler tools and available commands, so as to establish the order in which particular modules are initialized. For example, three levels of initialization may currently be specified in a Microsoft Windows environment which are referred to as the "compiler", "lib", and "user" levels.

When a module, whether it is an executable (.exe) or a dynamic link library (.dll), begins execution the entry point is typically in code that is in runtime libraries (e.g., C/C++ runtime libraries). That code looks at tables prepared partly during the compilation process and partly during the link process. The tables include a list of initializers in the "compiler" group, a list of initializers in the "lib" group, and a list of initializers in the "user" group. Within each of these groups it is difficult, if not impossible, to control the order in which members of the group are initialized. However, the compiler will do everything in a higher priority group (e.g., the "compiler" group which has the highest priority) before it does anything in a lower priority group.

The present invention takes advantage of this ability to control the initialization order of components. The default initialization level for a piece of code (program component) is the "user" level which is the lowest priority of the three levels. By using compiler specifications, a particular component may be assigned the "compiler" or "lib" initialization levels. The "compiler" initialization level is typically reserved for the C/C++ runtime libraries and equivalent. However, it can be used by applications and is used for initialization of the first load DLL (VSINIT.dll) in the currently preferred embodiment of the present invention. This enables the first load DLL to set up a security environment and exception-handling environment before other modules are initialized. For example, including an appropriate "pragma" instruction (e.g., #pragma init_seg(compiler) or #pragma init_seg(lib) in C++) in a given file enables the initializers in the file to be assigned to the "compiler" group or the "lib" group. A "pragma" is an implementation-defined instruction to the compiler. Pragmas are machine- or operating system-specific by definition, and are usually different for every compiler.

The present invention also takes advantage of the fact that through normal programming a developer can cause a function to be executed during the initialization process (e.g., through using appropriate C++ instructions). For example, by declaring a static variable and assigning its value to be equal to the return value of a given function, the function will be executed during initialization so that the value of the static variable is set up at initialization time. In the currently preferred embodiment, a static initializer in one of the stubs that is linked in to the importer (e.g., ZoneAlarm.exe) includes a pragma specifying that the static initializer is in the "lib" group. This execution of this static initializer code causes a designated exception to be raised. This exception is then handled by the exception-handling environment (or "exception filter") that has previously been initialized by the first load DLL (VSINIT.dll). More particularly, the first load DLL exports, by ordinal only, an exception filter. A static initializer in the "lib" group, executing in a guarded body of code, explicitly raises an exception that is then analyzed by the exception filter.

The exception filter analyzes where the exception has occurred (i.e., locates the module in which the exception has occurred) and validates the Authenticode signature of the module. If the validation (authentication) fails, the exception handler may display a message in the user interface indicating that validation failed and then terminate the current application (e.g., terminate an application program). If the module is validated, the exception filter returns a value (EXCEPTION_CONTINUE_EXECUTION) that tells the system to stop its search for an exception handler, and the system continues execution at the point where the exception occurred.

When the export module (e.g., VSUTIL.dll) is loaded it will also include the same validation stubs as described above for the importer (ZoneAlarm.exe). Accordingly, the same type of validation is performed when the export module is loaded. The same steps described above for validation of the importer also apply to validation of the exporter. In addition, the secure export table (if applicable) of the export module is parsed and any stubs are also fixed up in a fashion similar to that described above. However the mechanism at build time for ensuring that the export module (VSUTIL.dll) is validated is slightly different. More particularly, one set of build commands is used for securing .exe modules (files) and another set of build commands is used for securing .dll modules. In the case of a .dll module (e.g., VSUTIL.dll), an "ENTRY" instruction (DLL entry point) is used instead of an "INCLUDE" instruction to provide that the exception handling is properly set up to facilitate the validation of the .dll module. This process is described in more detail below.

Secure Dynamic Imports

The present invention addresses two different types of dynamic imports. In a typical implementation, an import module which self-validates can have both secure static imports and secure dynamic imports. In this circumstance, a similar approach to that described above for establishing secure load time (static) imports is used for securing runtime (dynamic) imports. However, in some environments there are also certain modules that do not self-validate (e.g., a third party component such as an installer used for installing programs). A somewhat different approach is used for secure "dynamic-only" imports for these modules. These secure "dynamic-only" imports are described below in this document.

Before describing secure "dynamic-only" imports, dynamic imports by a module that provides for self-validation will be described. Recall that with conventional runtime (dynamic) imports, the importer specifically asks for the address of the target (export) function (e.g., via a call to a "GetProcAddress" Win32 API function) and then calls the target using the address that is obtained. This exposes the program to attack as it enables an attacker to use the "GetProcAddress" function to intercept calls between components of a program. A hacker can also use a debugger, or other tools, to watch all calls to "GetProcAddress", in order to obtain a partial profile of the program's behavior as previously described.

Figure 5:
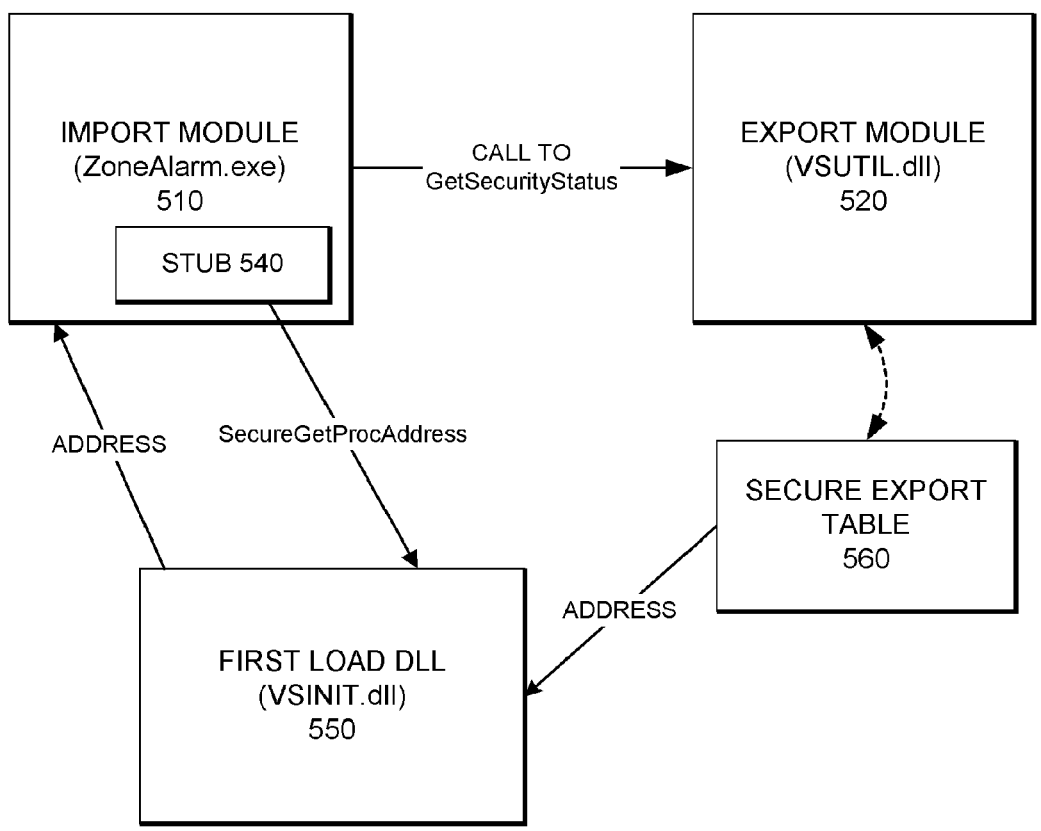
FIG. 5 is a block diagram of an environment in which the system and methodology of the present invention may be employed for securing a program including an export module that is dynamically imported.

FIG. 5 is a block diagram of an environment 500 in which the system and methodology of the present invention may be employed for securing a program including an export module that is dynamically imported. As shown, environment 500 includes an import module 510 (e.g., ZoneAlarm.exe), an export module 520 (e.g., VSUTIL.dll), a stub 540, a first load DLL 550 (e.g., VSINIT.dll), and a secure export table 560. The operation of these components at runtime in resolving a call made by the import module 510 to an exported function (e.g., a "GetSecurityStatus" function) of the export module 520 will now be described.

In this example, the import module 510 has one or more conventional static imports which import export functions of the first load DLL 550 (VSINIT.dll). For example, the import module 510 imports a function of the first load DLL 550 for performing the validation process described above. In addition, the import module 510 also has a secure static import to "SecureGetProcAddress" of the first load DLL which performs the same function as the conventional "GetProcAddress" function of KERNEL32.dll, but in a more secure fashion. Specifically, the "SecureGetProcAddress" function retrieves the address of export functions that are of interest. This includes export functions in the export module 520 (e.g., the "GetSecurityStatus" function") as well as other functions such as operating system services.

It should be noted that the importer (executable file 510) still includes a source-level call to the "GetProcAddress" function of KERNEL32.dll. However, a library that is supplied as linker input resolves this call by the importer to be a call to the "SecureGetProcAddress" function of VSIN-IT.dll (i.e., the first load DLL 550). The "SecureGetProcAddress" routine is actually a secure static import to the import module 510, so a local stub function 540 is actually invoked in a manner similar to that described above for static imports. After all the fix ups are made, the call is actually resolved to a call to "SecureGetProcAddress". Note that because "SecureGetProcAddress" is itself securely imported, it can only be called by importers that have passed validation. Although a single stub 540 is shown at FIG. 5, in the currently preferred embodiment, a different stub is typically created in the importer (executable file 510) for every export module (e.g., dynamic link library) for which the importer has secured static imports. For example, the ZoneAlarm.exe import module 510 may have a first stub for VSINIT.dll and a second stub for VSUTIL.dll.

Typically, the "SecureGetProcAddress" routine operates by first looking to see if the import module 510 is importing a conventional static import (e.g., from KERNEL32.dll). The routine will then look for an entry for the export function in a conventional export table for the export module. If the listing cannot be found in the conventional export table, then the "SecureGetProcAddress" routine looks for the listing in the secure export table (e.g., the secure export table 560 associated with export module 520 which was initialized earlier following successful self-validation of the exporter). If found, the address (function pointer) is then returned to the caller.

Secure "Dynamic-only" Importers

The security methodology of the present invention provides that an exporter of secure APIs must self-validate. Also, an importer of secure APIs must self-validate if any of its imported APIs are imported statically. In some cases, a module (e.g., a third party component such as an installer) that does not provide for self-validation may require access to secure application programming interfaces of a program. In this case, other arrangements are necessary to grant the importer access to an exporter's secure APIs. To address this requirement, the present invention includes a methodology for "dynamic-only" importers which provides this access in a manner that does not enable an attacker to easily circumvent the security measures provided by the present invention. Generally, this "dynamic-only" import methodology provides for a specific load of VSUTIL.dll, VSINIT.dll, and/or other modules. A designated function is then called (for example, one created for a particular third-party installer) to perform a number of steps for validating the caller (e.g., checking its signature and/or that of its parent process) before permitting access.

This may be illustrated by the following example. The exporter may define a conventional export function, e.g., "tvInitialize", that the importer can call to request subsequent access to secure APIs. When invoked, this "tvInitialize" function validates the calling module (i.e., the importer) before granting access. The caller is typically validated via its MD5 signature or its Authenticode signature. If the caller is successfully validated, the exporter grants access by changing the "GetProcAddress" pointer in the importer's import table to the address of the first load DLL's "SecureGetProcAddress" function. In the currently preferred implementation, this modification of the importer's import table is performed by private function "SetTheGetProcAddressHook" in the first load DLL.

To accommodate multiple concurrent importers, the import table overwrite is not the function "SetTheGetProcAddressHook" itself, but rather a stub function that sets a variable identifying the calling module before passing control to "SecureGetProcAddress". The stubs are created only as needed in the currently preferred embodiment. This means that to be properly implemented, they generally should be allocated from memory that is granted execution rights.

Methods for Building Program Components

Figure 6A:
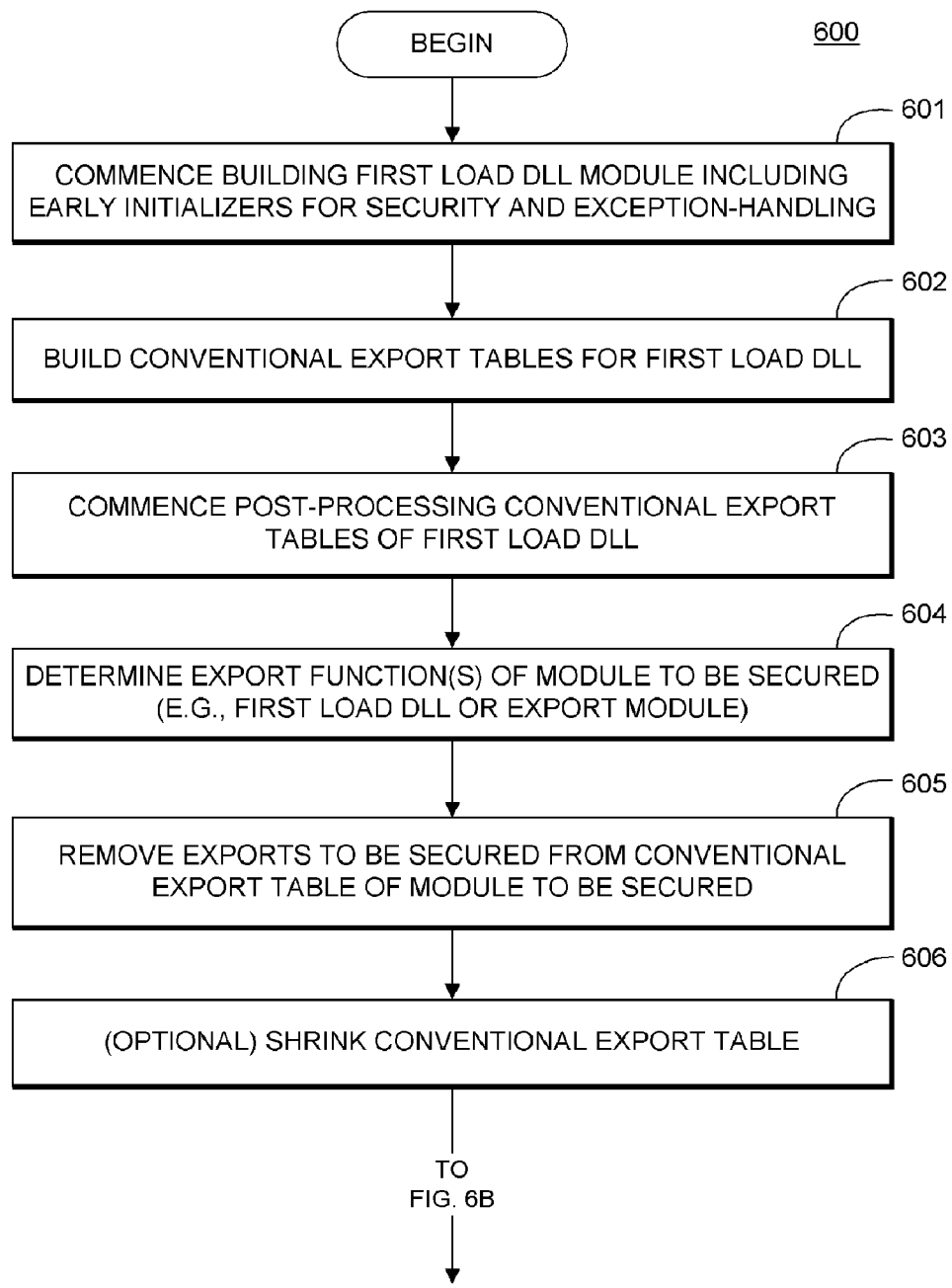
FIGS. 6A-B comprise a single flowchart illustrating the high-level methods of operation of the system of the present invention in building a program in a manner which enables interfaces of components (i.e., executable files) of the program to be secured.
Figure 6B:
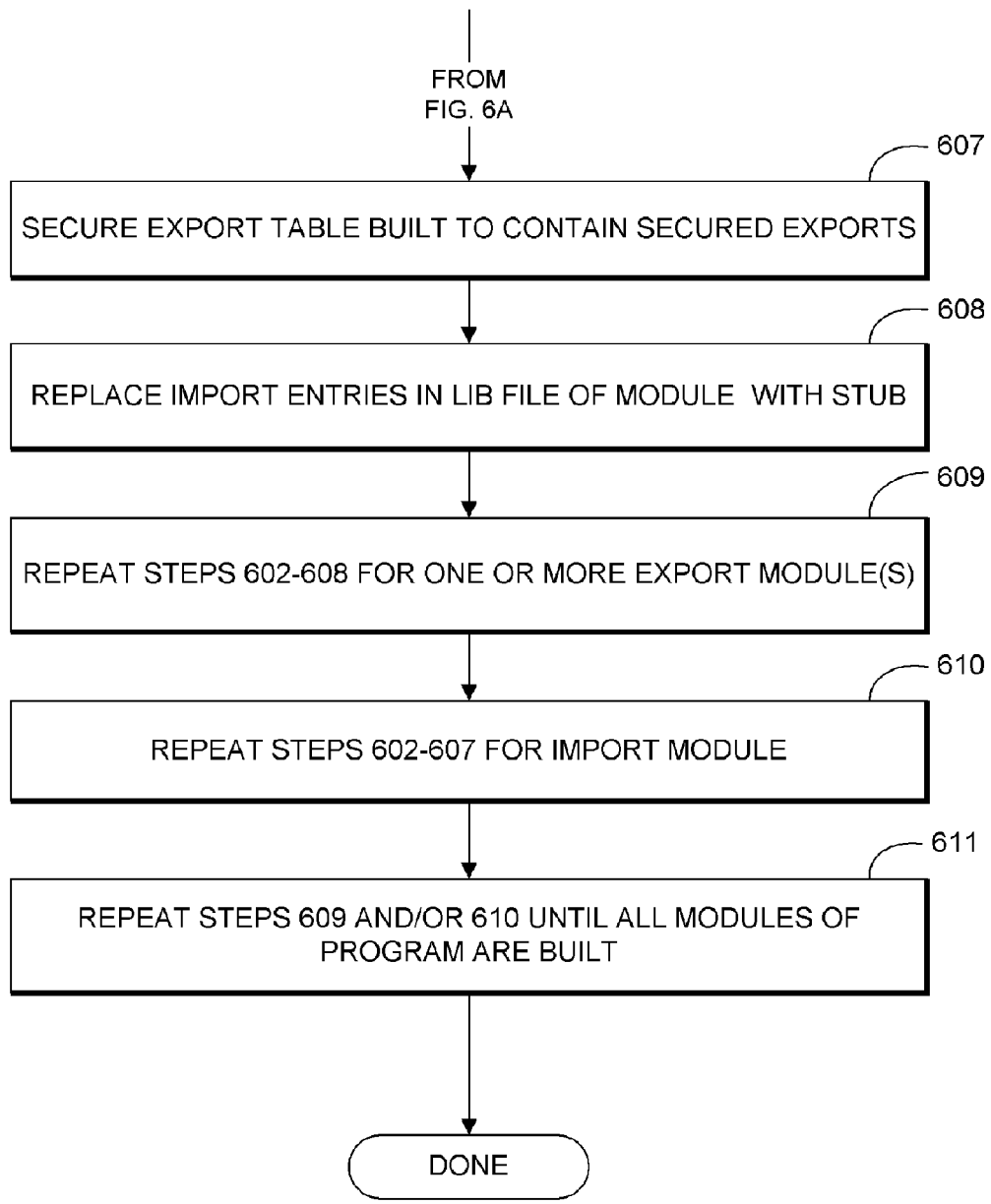

FIGS. 6A-B comprise a single flowchart 600 illustrating the high-level methods of operation of the system of the present invention in building a program in a manner which enables interfaces of components (i.e., executable files) of the program to be secured. The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). The following discussion uses an example of executable files installed in a Microsoft Windows environment to illustrate the operations of the present invention. However, those skilled in the art will appreciate that this is only one example of an environment in which the present invention may be advantageously utilized.

At step 601 the process of building the first load DLL (e.g., VSINIT.dll) commences. As the first load DLL includes secured exports which will be used in building other modules, the first load DLL must build the required tables before the importers are initialized. The methodology of the present invention provides for building the first load DLL in a manner that provides for early initialization of portions of the first load DLL. In the presently preferred embodiment, early initialization is specified by marking these portions to be included as part of the "compiler" initialization group to provide for initialization before other modules as previously described. In particular, the early initialization of the first load DLL (VSINIT.dll) provides for the environment for validation and exception-handling to be set up before other modules are initialized. The early initialization also provides for the first load DLL module to validate its Authenticode signature. The validation function runs in a "lib" level initializer so that it runs after the validation environment is set up. In the presently preferred embodiment, the same validation routine is used for validation of the first load DLL as well as other modules (e.g., ZoneAlarm.exe and VSUTIL.dll).

At step 602, conventional export tables are built for the first load DLL. It should be noted that these conventional export tables may include both exports that are to be secured using the methodology of the present invention as well as certain exports that will not be secured (e.g., the exception filter function as described below).

At step 603, the process of post-processing the conventional export tables of the first load DLL commences. In the currently preferred embodiment a "SecurePE.exe" module is invoked to post-process the export tables of the first load DLL (VSINIT.dll). In the currently preferred embodiment, the SecurePE.exe module receives the following three files as input: VSINIT.dll, VSINIT.lib, and VSINIT.def. Another input parameter is a VSINIT.hash file, which specifies an output file used primarily for debugging purposes. The "SecurePE.exe" module reads and modifies VSINIT.dll and VSINIT.lib, and it reads VSINIT.def. By analyzing these files (e.g., reading the VSINIT.def file), at step 604 the export functions of the module that are to be secured (e.g., the first load DLL) are determined (i.e., identified). The build process includes a module definition file (e.g., VSIN-IT.def file) which supports a comment syntax which can be used to indicate that a specific export should not be secured.

In the currently preferred embodiment, all exported functions are generally secured unless otherwise indicated in the module definition file. A user (e.g., developer) using the system and methodology of the present invention may have particular reasons that certain exports should not be secured (e.g., to facilitate interoperation with third party programs). A developer can specify particular export functions that should not be secured in the module definition file. For instance, in the presently preferred embodiment, the default exception filter function of the first load DLL is unsecured (e.g., "VSINIT.DefaultExceptionFilterEx"). However, only an ordinal is assigned to this function (i.e., no name is assigned) so that the clear text of the function name does not appear in the module's export table.

At step 605, any export that is to be secured is removed from the (conventional) export table. At (optional) step 606, the conventional export table is shrunk (as an optional efficiency measure to conserve space in the file and in memory). At step 607, a secure (proprietary) export table is built to contain the secured exports.

Conventional exports are also typically included as library members in a library file (e.g., VSINIT.lib) that is used by importers, so these library file entries also need to be adjusted. For exports that are secured, these import member entries are removed from the associated library file. At step 608 a "stub" or small piece of executable code is created and added to the library file (e.g., VSINIT.lib) for each import member removed from the library file. This stub has linker information that will cause the function name that is being called (i.e., an import member removed from the lib file) to be resolved to this stub (executable code) when the importer links. In addition to these stub(s), one additional piece of code is added to the library file that aids in the resolution of calls to this module at runtime. In the currently preferred embodiment, the function stub that is created for a particular exported function includes a hash of the function name (e.g., hashed into a 32 bit quantity) and a hint (or index into the secure export table) which can facilitate finding a particular function name. At runtime one can use the hint to locate a particular exported function or, if the hint does not match (e.g., because of subsequent changes made after the module was built), then a binary search can be performed on a table of these hashed values. It should be noted that the hint values are not required for implementation of the methodology of the present invention, but rather are provided as a performance enhancement.

After the building of the first load DLL (VSINIT.dll) is completed, at step 609 the build process illustrated above at steps 602-608 is repeated for one or more export module(s) of the program. For instance, assuming the same environment previously illustrated at FIG. 4, the VSUTIL.dll module having the exported "GetSecurityStatus" function would be built at step 609. The same build process provided above at steps 602-608 is repeated for each of the export modules, except that the input to the linker includes a SECURELINK-S.lib file and the VSINIT.lib file which was created as a result of the foregoing steps in building VSINIT.dll. The SECURELINKS.lib file provides the stubs for self-validation (for modules other than VSINIT.dll) and for resolution of secure static imports. Otherwise, the build process for these export modules is essentially the same as previously described, although it should be noted that the build process for these export modules does not include providing for the early ("compiler" group) initialization which is applicable only to the first load DLL. The build process does result in post-processing the export tables to create secure export tables as previously described.

At step 610, the executable file of the import module (e.g., ZoneAlarm.exe) is built in a similar fashion. Steps 602-607 are repeated for building the executable file. As with building the export modules, the same build process provided above at steps 602-607 is repeated, except that the input to the linker includes a SECURELINKS.lib file, the VSINIT.lib file which was created as result of the foregoing steps in building VSINIT.dll, and the library file(s) created as a result of building the export modules that are linked with the importer (e.g., a VSUTIL.lib created during building of VSUTIL.dll).

At step 611, steps 609 and/or 610 may be repeated until all files of the program are built. As required for conventional linking, files need to be built in the correct order so that the files used by an importer (i.e., the library (.lib) files) are built before the importer is built.

Load Process

Figure 7A:
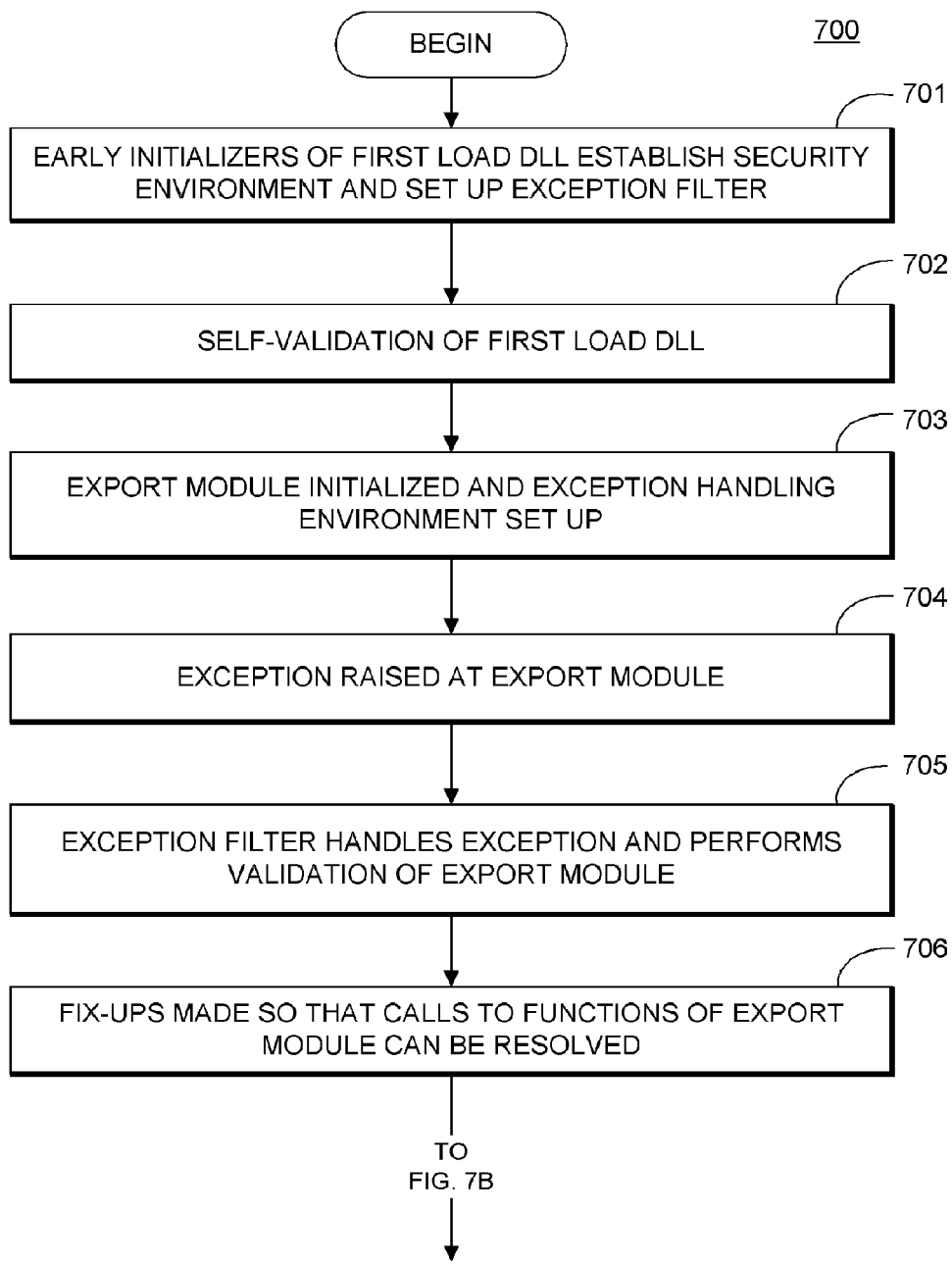
FIGS. 7A-B comprise a single flowchart illustrating the high-level load time operations of the present invention in loading and initializing modules of a program constructed in accordance with the present invention.
Figure 7B:
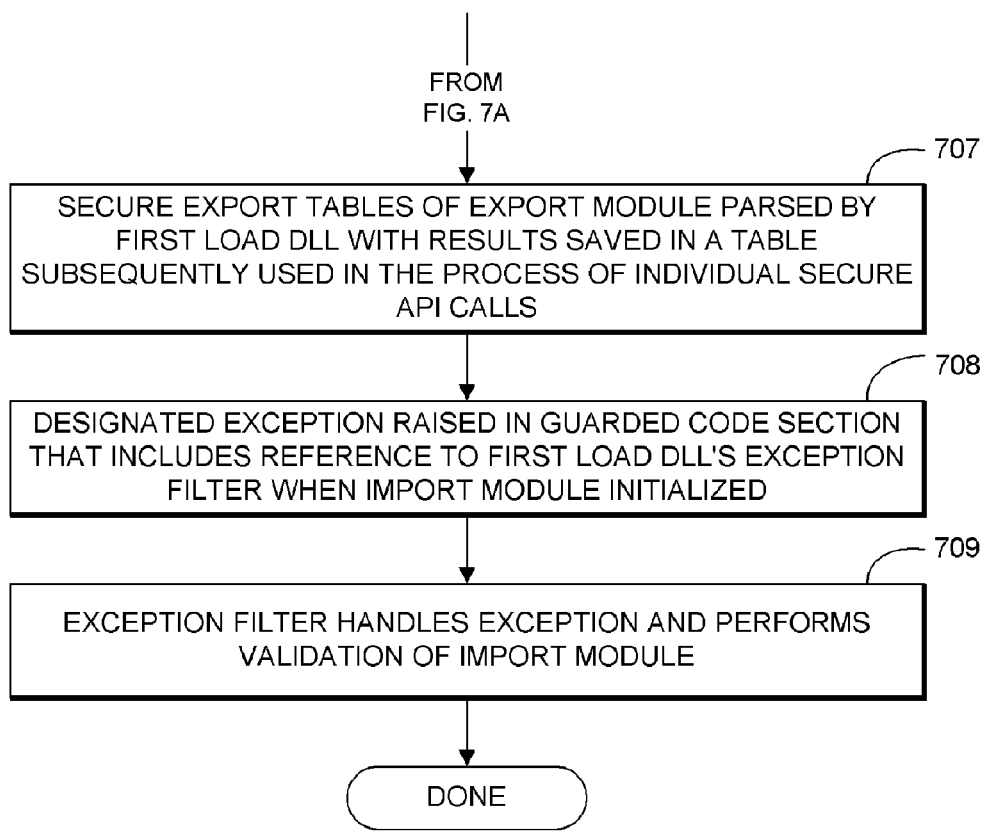

FIGS. 7A-B comprise a single flowchart 700 illustrating the high-level load time operations of the present invention in loading and initializing modules of a program constructed in accordance with the present invention. As with FIGS. 6A-B, the following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

For purposes of illustrating these operations, the following discussion uses an example of a program comprised of an import module (ZoneAlarm.exe) which imports a function that is exported by an export module (VSUTIL.dll), and a first load DLL (VSINIT.dll), all of which implement the methodology of the present invention. The following discussion also uses an example of executable files installed in a Microsoft Windows environment. However, those skilled in the art will appreciate that this is only one example of an environment in which the present invention may be advantageously utilized. Those skilled in the art will also understand that the methodology of the present invention may also be used in conjunction with a program having a different number of component modules and/or a program installed in a different operating environment.

It should be noted that the actual order in which the modules are initially loaded is different than the order described below. The import module (ZoneAlarm.exe) is generally the first module to load; however it does not initialize. The export module (VSUTIL.dll) is typically the next module to load, but the export module also does not initialize. The first load DLL (VSINIT.dll) is then loaded and initialized as described below.

As previously described, the first load DLL includes both "compiler" group initializers and "lib" group initializers which cause certain component routines to be initialized before other program components. When the program including the first load DLL (VSINIT.dll) is loaded, at step 701 "compiler" group (early) initializers of the first load DLL provide for establishing a security environment and an exception filter (handler) before the initialization of the import module (ZoneAlarm.exe) or the exporter (VSUTIL.dll). Establishing the security environment ensures that tools and utilities that are needed are available in the environment on which the program is installed (given that all needed tools and utilities are not necessarily available on all environments). The exception filter is for intercepting the self-validation exceptions raised by other modules. Following initialization of the security environment and exception filter, at step 702 "lib" group initializers of the first load DLL provide for a self-validation of the first load DLL to be performed (e.g., based on an Authenticode signature of the first load DLL).

Next, at step 703 the exporter (VSUTIL.dll) is initialized. The export module does not include "compiler" group initializers. However, VSUTIL.dll is a dynamic link library that is built with a custom DLL entry point. The custom DLL entry point provides for the proper exception-handling environment to be set up so that when the self-validation exception is raised, the exception will be handled by the exception filter routine of the system of the present invention rather than by standard operating system mechanisms. Absent this custom entry point, the dynamic link library when loaded would operate in a standard exception-handling environment set up by the operating system. An exception raised in this standard exception-handling environment would typically generate an error message and would never reach the validation routines of the system of the present invention. The reason for this complexity of invoking the validation function indirectly by raising and filtering an exception as described herein is to make the validation function more obscure (and therefore also more secure). As a result of the approach of the present invention, there are no explicit calls to the validation function. If a third party attempts to disassemble the code in order to determine what is happening, they will observe an exception being raised rather than an explicit call to a validation function.

After the exception-handling environment is set up, at step 704 an exception is raised. At step 705 the exception that is raised is handled by the exception filter as previously described to perform the validation of the export module. During the validation process some fix ups are also made at step 706 so that calls to particular functions can be accurately resolved by funneling secure static imports to the export module through a particular piece of code (referred to as the "importer's funnel" or "VSUTILFunnel"). Absent these fix ups, the funnels raise an exception when they are called and the secure static import is not resolved. At step 707 the secure export tables of VSUTIL.dll are parsed by the first load DLL (VSINIT.dll), with the results saved in a table used later in the process of individual secure API calls.

The importer is also self-validated in a similar fashion. The importer includes a static initializer that raises a designated exception in a guarded code section that includes a reference to the first-load DLL's exception filter at step 708 when the importer is initialized. When the exception is raised, at step 709 the exception is handled by the exception filter to validate the importer as previously described. The runtime operations of the program will now be described.

Runtime Operations

After a program constructed in accordance with the present invention has been built and loaded, the secure export tables, the exception-handling environment, the importer's funnel (VSUTILFunnel), and the other components described above are set up and initialized. The following discussion will illustrate the runtime operations of the present invention using an example of a call made by an import module (e.g., ZoneAlarm.exe) to a "GetSecurityStatus" function of an export module (e.g., VSUTIL.dll). At runtime, when a call is made to the "GetSecurityStatus" function of VSUTIL.dll which is statically imported by ZoneAlarm.exe, the call goes into a stub function of ZoneAlarm.exe as previously described. The stub function pushes a hash value and a hint and then calls VSUTILFunnel. The VSUTILFunnel, in turn, calls a "ResolveSecureStaticLink" function which routes the call through the first load DLL (VSINIT.dll) as previously described and illustrated at FIG. 4.

The first load DLL determines the target module that is being called and makes sure that the export module (VSUTIL.dll) is loaded and has a valid Authenticode signature. The VSINIT.dll module reads the secure export table to locate the address of the "GetSecurityStatus" function in the secure export table. The call originally made by ZoneAlarm.exe is then executed against this "GetSecurityStatus" function and return values (if any) are then returned directly to ZoneAlarm.exe. If possible (i.e., if the calling instruction to "GetSecurityStatus" is 5 bytes or more and satisfies certain other conditions), VSINIT.dll then "back-patches" the call made by the ZoneAlarm.exe so that future calls may be made directly to VSUTIL.dll (i.e., the export module) without going through the stub function and the first load DLL (VSINIT.dll).

While the invention is described in some detail with specific reference to a single-preferred embodiment and certain alternatives, there is no intent to limit the invention to that particular embodiment or those specific alternatives. For instance, an implementation running in a Microsoft Windows environment is used to illustrate the operations of the present invention. However, this is only one example of an environment in which the present invention may be advantageously utilized. The present invention may be implemented in any type of system architecture or processing environment capable of supporting the methodologies of the present invention. Those skilled in the art will appreciate that modifications may be made to the preferred embodiment without departing from the teachings of the present invention.

What is claimed is:

1. A method for securing a program comprised of a plurality of interoperable components, the method comprising:
   extracting export information about a function of a first component of the program that is callable by at least one other component of the program, wherein said extracting step includes removing the export information from an export table of the first component;
   securing the extracted export information;
   in response to an attempt by a second component to invoke the function of the first component, validating authenticity of the second component;
   if the authenticity of the second component is validated, providing access to the function of the first component using the secured extracted export information; and
   otherwise, blocking the attempt by the second component to invoke the function.

2. The method of claim 1, further comprising:
   generating a signature for at least one other component of the program authorized to call the function of the first component, so as to enable authentication of said one other component.

3. The method of claim 2, wherein said step of generating a signature includes generating a selected one of an Authenticode signature and an MD5 message digest.

4. The method of claim 2, wherein said step of generating a signature includes generating a hash of said one other component and encrypting the hash with a private key.

5. The method of claim 4, wherein said validating step includes decrypting the hash with a public key and comparing the hash to a known value.

6. The method of claim 1, wherein said extracting step includes removing the function name from an export table of the first component.

7. The method of claim 1, wherein said securing step includes obscuring the function name.

8. The method of claim 1, wherein said securing step includes creating a secure export table for securing the extracted export information.

9. The method of claim 1, wherein said providing step includes routing a call by the second component to the function of the first component.

10. The method of claim 1, wherein said providing step includes returning an address of the function of the first component to the second component.

11. The method of claim 1, wherein said extracting step includes extracting export information about a function of the first program specified by a user.

12. A computer-readable medium having processor-executable instructions for performing the method of claim 1.

13. The method of claim 1, further comprising:
   providing a downloadable set of processor-executable instructions for performing the method of claim 1.

14. A method for securing a program comprised of a plurality of modules, at least one of the modules having export information for allowing other modules to invoke its program code, the method comprising:
   generating signatures for at least some of the program's modules;
   as the program is loaded, validating said signatures so as to verify authenticity of respective modules of the program;
   for each module having program code that may be invoked by another module, removing that modules export information, wherein said removing step includes removing information from an export table;
   securely storing any removed export information;
   for each module having its export information removed, blocking any attempt from another module to invoke its program code if the other module cannot be authenticated; and
   if the other module is authenticated, allowing the attempt to proceed using the securely stored export information.

15. The method of claim 14, wherein said generating step includes generating a selected one of an Authenticode signature and an MD5 message digest.

16. The method of claim 14, wherein said generating step includes generating a hash of a module and encrypting the hash with a private key.

17. The method of claim 16, wherein said validating step includes decrypting the hash with a public key and comparing the hash to a known value.

18. The method of claim 14, further comprising:
   providing a security module for validating authenticity of a module.

19. The method of claim 18, wherein the security module includes instructions causing the security module to be initialized before other modules of the program.

20. The method of claim 18, wherein an attempt to invoke a module having its export information removed is routed to the security module.

21. The method of claim 20, wherein the security module allows the attempt to proceed if the other module making the attempt is authenticated.

22. The method of claim 14, wherein said allowing step includes returning an address of program code of the module having its export information removed if the other module is authenticated.

23. The method of claim 14, wherein said removing step includes removing export information for a particular module specified by a user.

24. The method of claim 14, wherein said securely storing step includes obscuring removed export information.

25. The method of claim 14, further comprising:
in response to an attempt to invoke program code of a given module, verifying authenticity of the given module and blocking the attempt if the given module cannot be authenticated.

26. The method of claim 14, further comprising:
after allowing the attempt to proceed, providing for subsequent attempts by the other module to invoke the program code to directly invoke the program code.

27. A computer-readable medium having processor-executable instructions for performing the method of claim 14.

28. The method of claim 14, further comprising:
providing a downloadable set of processor-executable instructions for performing the method of claim 14.

29. A system for securing a program comprised of a plurality of interoperable components, the system comprising:
a module for extracting export information about a function of a first component of the program that is callable by at least one other component of the program wherein the module for extracting removes an export table entry for the function of the first component;
a module for securing the extracted export information;
a validation module for validating authenticity of a second component attempting to obtain export information to invoke the function of the first component, validating authenticity of the second component; and
a security module for blocking the attempt to invoke the function of the first component if the second component cannot be authenticated.

30. The system of claim 29, wherein the validation module validates authenticity of the second component based on examining a digital signature of the second component.

31. The system of claim 29, further comprising:
a module for generating a signature for at least some components of the program, so as to enable authentication of said at least some components.

32. The system of claim 31, wherein the module for generating generates a selected one of an Authenticode signature and an MD5 message digest.

33. The system of claim 31, wherein the module for generating generates a hash of a module and encrypts the hash with a private key.

34. The system of claim 33, wherein the validation module decrypts the hash with a public key and compares the hash to a known value.

35. The system of claim 29, wherein the security module routes the attempt to invoke the function to the first module using the extracted export information if the second module is authenticated.

36. The system of claim 29, wherein the security module returns an address of the function of the first module if the second module is authenticated.

37. The system of claim 29, wherein the module for securing creates a secure export table including the extracted export information.

38. The system of claim 37, wherein the secure export table is created without using a clear text name for the function of the first module.

39. The system of claim 37, wherein the module for securing obscures function names in the secure export table.

40. The system of claim 29, wherein the security module inserts executable code into the second module during initialization of the second module so as to direct an attempt by the second module to invoke the function of the first module to the security module.

41. The system of claim 40, wherein the security module modifies the executable code included in the second module if the second module is authenticated so as to enable the second module to directly invoke the function of the first module.

42. A method for securing an exported function of a program, the method comprising:
extracting export information about the exported function of the program, wherein said extracting step includes removing an export table entry for the exported function;
securing the extracted export information;
intercepting an attempt to access the exported function by an importer;
authenticating the importer for determining whether to permit access to the exported function;
if the importer is authenticated, providing access to the exported function based on the secured extracted export information; and
otherwise, blocking access to the exported function.

43. The method of claim 42, wherein the importer comprises another module of the program.

44. The method of claim 42, wherein the importer comprises another program.

45. The method of claim 42, wherein said authenticating step includes authenticating the importer based on a digital signature of the importer.

46. The method of claim 42, further comprising:
generating a digital signature for at least some executable modules of the program, so as to enable authentication of said at least some executable modules.

47. The method of claim 46, wherein said generating step includes generating a selected one of an Authenticode signature and an MD5 message digest.

48. The method of claim 46, wherein said authenticating step includes validating digital signature of the importer.

49. The method of claim 42, further comprising:
authenticating a program module including the exported function before providing access to the exported function.

50. The method of claim 42, wherein said providing step includes routing a call by the importer to the exported function.

51. The method of claim 42, wherein said providing step includes returning an address of the exported function to the importer.

52. The method of claim 42, wherein said securing step includes obscuring the exported function name.

53. The method of claim 42, wherein said securing step includes creating a secure export table based on the extracted export information.

54. A computer-readable medium having processor-executable instructions for performing the method of claim 42.

55. The method of claim 42, further comprising:
providing a downloadable set of processor-executable instructions for performing the method of claim 42.

* * * * *